US012008004B1

(12) United States Patent
Fournier et al.

(10) Patent No.: US 12,008,004 B1
(45) Date of Patent: Jun. 11, 2024

(54) SITUATION-AWARE EXPLAINABILITY FOR ARTIFICIAL INTELLIGENCE-ENABLED, PROCESS-AWARE SYSTEMS USING COMPLEX EVENT PROCESSING

(71) Applicant: INTERNATIONAL BUSINESS MACHINES CORPORATION, Armonk, NY (US)

(72) Inventors: Fabiana Fournier, Givat Ela (IL); Skarbovsky Yudovich Inna, Haifa (IL); Guy Amit, Tel Aviv (IL); Lior Limonad, Afek (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 18/066,916

(22) Filed: Dec. 15, 2022

(51) Int. Cl.
*G06F 16/00* (2019.01)
*G06F 16/242* (2019.01)
*G06F 16/2457* (2019.01)

(52) U.S. Cl.
CPC ...... *G06F 16/24578* (2019.01); *G06F 16/244* (2019.01); *G06F 16/24575* (2019.01)

(58) Field of Classification Search
CPC .................................................. G06F 16/24575
See application file for complete search history.

(56) References Cited

U.S. PATENT DOCUMENTS 11,146,471 B2 10/2021 Duesterwald et al.
2020/0242491 A1* 7/2020 To ............................. G06N 5/04
2021/0201184 A1 7/2021 Scheepens et al.

OTHER PUBLICATIONS

Donovang-Kuhlisch M. "Achieving Semantic Interoperability By Using Complex Event Processing Technology," Informatik 2007—Informatik trifft Logistik—Band 1, 2007, 5 pg.
Parra-Ullauri, JM et al., "Event-driven temporal models for explanations-ETeMoX: explaining reinforcement learning," Software and Systems Modeling, Jun. 2022, vol. 21, No. 3, pp. 1091-1113.
Lopardo, G., "Explainable AI for business decision-making," Sep. 2021, 83 pg.

(Continued)

*Primary Examiner* — Ajith Jacob
(74) *Attorney, Agent, or Firm* — CUENOT, FORSYTHE & KIM, LLC

(57) ABSTRACT

Providing a machine-generated explanation of an outcome of a process execution engine includes inputting into a complex event processing (CEP) engine at least one predetermined event pattern specification and a sequence of events, the sequence of events generated, at least in part, by a process execution engine executing a predetermined process in real time. Using the CEP engine, an enriched event log is generated based on the input. The enriched event log includes the sequence of events and additionally includes one or more situational events corresponding to one or more of the sequence of events. The one or more situational events are derived by the CEP engine based on the at least one predetermined event pattern specification. A hypothesis-oriented, situationally aware explanation for the outcome of the predetermined process is determined using an artificial intelligence (AI) explainability framework with input of the enriched event log.

20 Claims, 6 Drawing Sheets

(56) References Cited

OTHER PUBLICATIONS

Hermosillo, G., "Towards creating context-aware dynamically-adaptable business processes using complex event processing," PhD diss., Université des Sciences et Technologie de Lille-Lille I, 2012, 176 pg.

Hermosillo, G., et al., "Using complex event processing for dynamic business process adaptation," In2010 IEEE International Conference on Services Computing, Jul. 5, 2010, pp. 466-473, IEEE.

Amit, G. et al., "Model-informed LIME Extension for Business Process Explainability," In International Joint Conference on Artificial Intelligence, Jul. 23, 2022, 4 pg. (Abstract Only).

Dumas, M. et al., "Augmented business process management systems: A research manifesto," arXiv:2201.12855, 18 pg., Jan. 30, 2022, 19 PG.

Jan, ST et al., "AI trust in business processes: the need for process-aware explanations," InProceedings of the AAAI Conference on Artificial Intelligence, Apr. 3, 2020, (vol. 34, No. 08, pp. 13403-13404.

Upadhyay, S. et al., "Extending LIME for business process automation," arXiv preprint arXiv:2108.04371, Aug. 9, 2021, 6 pg.

Mell, P. et al., The NIST Definition of Cloud Computing, National Institute of Standards and Technology, U.S. Dept. of Commerce, Special Publication 800-145, Sep. 2011, 7 pg.

\* cited by examiner

| case ID | credit_score | risk | done_receive_loan | done_verify_amount | done_credit_check | done_risk_assessment | done_skilled_agent | done_novice_agent | done_accept |
|---|---|---|---|---|---|---|---|---|---|
| TVQR | 1173.08 | 397.78 | TRUE | TRUE | TRUE | FALSE | TRUE | FALSE | FALSE |

...

| arrival_time | post_received_time | post_verify_amount_time | post_credit_check_time | post_risk_assessment_time | post_skilled_agent_review_time | post_novice_agent_review_time | post_decision_time |
|---|---|---|---|---|---|---|---|
| 48 | 54 | 59 | 71 | NaN | 87 | NaN | 92 |

SITUATION-AWARE EXPLAINABILITY FOR ARTIFICIAL INTELLIGENCE-ENABLED, PROCESS-AWARE SYSTEMS USING COMPLEX EVENT PROCESSING

BACKGROUND

This disclosure relates to artificial intelligence (AI) and, more particularly, to machine-generation of explanations for outcomes reached by AI-endowed, process-aware systems.

AI is increasingly used for an ever-expanding array of tasks. For example, AI is the basis of a new generation of augmented business process management systems (ABPMSs) or AI-endowed, process-aware systems (APASs). Such systems automate tasks pertaining to the discovery, modeling, analyzing, and optimizing of business processes. AI-endowed, process-aware systems are used more and more, for example, to assist decision makers in making decisions regarding business hiring, approving loan applications, and the like.

Notwithstanding the considerable advantages afforded by such systems, a remaining challenge is comprehending and retracing how an APAS generates a specific result or outcome. The outcome typically depends on many features. These features include the context or situations under which a process is executed by the APAS and which thus can affect the outcomes generated by the APAS.

Understanding how an APAS generates a specific outcome—that is, APAS explainability—can be important for many reasons. A growing number of governments, for example, have enacted or are proposing legislation that requires businesses that use such systems to assist in decisions such as hiring and lending to explain how the APAS generates a decision. APAS explainability is not only import for meeting regulatory standards but also for helping developers to ensure that the system is working as expected, for example. As APAS becomes more complex, providing APAS explainability may become even more important, while also becoming even more challenging.

Although a conventional APAS may employ conventional AI explainability to generate an explanation about a process execution, the explanation is typically inadequate or incomplete owing to the system's inability to generate an explanation based on situational conditions under which the process executes. A complete explanation cannot be derived from a "local" inference—that is, a currently executing process instance. An incomplete explanation, even though not intentionally untruthful, can often be an incorrect explanation. Conventional techniques are incapable of situation-aware APAS explainability, and thus may not always provide a complete explanation of an outcome generated by an APAS.

SUMMARY

In one or more embodiments, a method includes inputting into a complex event processing (CEP) engine at least one predetermined event pattern specification and a sequence of events, the sequence of events generated, at least in part, by a process execution engine that executes a predetermined process in real time. Process events also can be acquired from external sources within the environment in which the process executes. The method includes generating, using the CEP engine in response to the inputting, an enriched event log. The enriched event log includes the sequence of events and additionally includes one or more situational events corresponding to one or more of the sequence of events. The one or more situational events are derived by the CEP engine based on the at least one predetermined event pattern specification. The method includes determining, using an artificial intelligence (AI) explainability framework with input of the enriched event log, a hypothesis-oriented, situationally aware explanation for an outcome of the predetermined process. The method includes outputting, using computer hardware, the hypothesis-oriented, situationally aware explanation.

In one aspect, determining the hypothesis-oriented, situationally aware explanation comprises determining a plurality of situations that determine the outcome of the predetermined process, and ranking the plurality of situations in response to determining a strength of association between the outcome and each of the plurality of situations.

In another aspect, the hypothesis-oriented situationally aware explanation is generated in real time.

In another aspect, the hypothesis-oriented situationally aware explanation is generated retrospectively based on a replay of an event log comprising the sequence of events.

In another aspect, in which the hypothesis-oriented situationally aware explanation is generated retrospectively, the replay of the event log is performed after performing a time-based compression of the event log.

In another aspect, in which the hypothesis-oriented situationally aware explanation is generated retrospectively the sequence of events is input to the CEP engine as an event log generated by transforming the sequence of events with a data synthesis prior to the inputting into the CEP engine. Data synthesis generates a data structure for each execution of the process, the data structure including an identifier for each execution, a plurality of sequential events having a same identifier, a time stamp for each of the plurality of sequential events, and one or more decision variables corresponding to one or more of the plurality of sequential events.

In one or more embodiments, a system includes a processor configured to initiate executable operations as described within this disclosure.

In one or more other embodiments, a computer program product includes one or more computer readable storage mediums having program code stored thereon. The program code is executable by a processor to initiate executable operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIGS. 5A and 5B illustrate an example application of certain features of the SALE framework illustrated in FIGS. 1 and 2.

DETAILED DESCRIPTION

Figure 1:
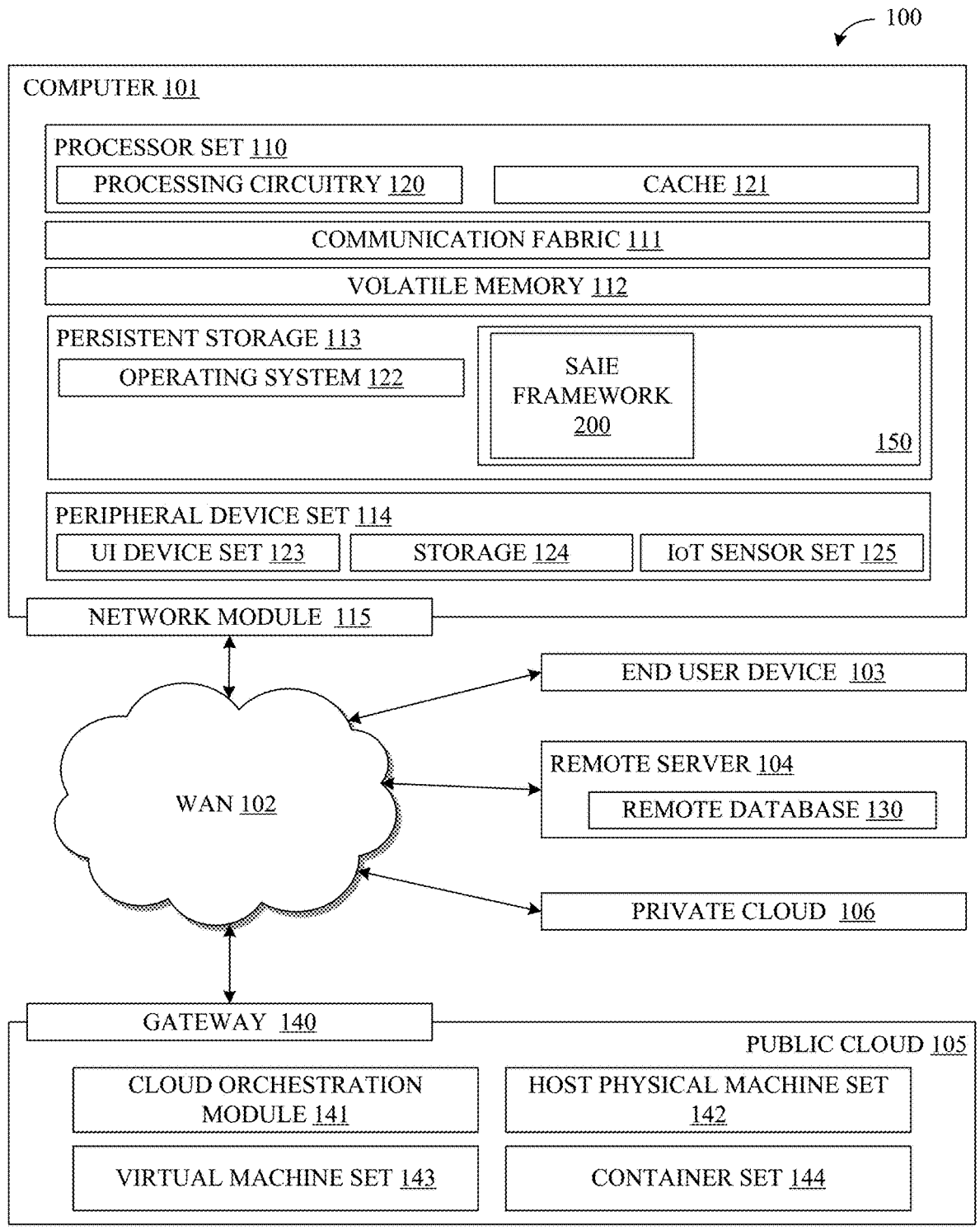
FIG. 1 illustrates an example of a computing environment that is capable of implementing a situation-aware AI explainability (SALE) framework.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to AI and, more particularly, to machine-generation of explanations for outcomes reached by APASs. A full and complete explanation, however, requires the input of contextual conditions, or "situations," relevant to the current process instance. Many, if not all, conventional systems and methodologies do not provide the situational awareness necessary for generating a full and complete explanation of an APAS outcome.

In accordance with the inventive arrangements disclosed herein, methods, systems, and computer program products are provided that are capable of providing a hypothesis-oriented, situationally aware explanation of an outcome generated by an AI-endowed process execution engine. As defined herein, "hypothesis-oriented, situationally aware explanation" means a machine-generated output that identifies the one or more data features or events that caused a particular outcome of a process executed by the process execution engine. The process execution engine, in certain embodiments, is an ABPMS or other business process management (BPM) module that orchestrates the execution of a process based on the input of a predetermined process model. In other embodiments, the inventive arrangements disclosed herein provide hypothesis-oriented, situationally aware explanations of outcomes generated by other types of process execution engines in other types of systems.

In one aspect, a machine-determined explanation generated in accordance with the inventive arrangements disclosed herein is a situationally aware explanation of an outcome of a process execution engine. That is, it is based not merely on the machine's processing data representing specific events of the process but additionally on data describing the situational context in which the events occur and/or the decisions made during execution of the process.

For example, the process execution engine may be configured to approve or reject a loan application. The process events can include automated decisions based on features (variables) like the loan amount requested and/or the credit rating of the requester. The decision to grant or reject the loan application, however, is not made in a vacuum. Situations such as an excess of pending applications piling up within the load processing system, or whether the loan has been pending for an inordinate amount of time, or whether an emergency situation (e.g., Covid-19 lockdown) occurred in the interim can affect the process outcome. The inventive arrangements disclosed herein enable a full explanation of the process outcome (grant or reject loan application) by assessing not only event outcomes and decisions but the situational context(s) in which they occur.

In another aspect, the machine-determined explanation generated by the inventive arrangements is a hypothesis-oriented explanation. That is, the inventive arrangements enable a user to test different hypotheses regarding why a process execution engine generates a particular outcome. The enablement is through inputting hypotheses, each articulated as an event pattern specification, into a complex event processing engine capable of deriving situational context (data comprising event patterns) and feeding the output of the complex event processing engine into an AI explainability framework capable of outputting the hypothesis-oriented, situationally aware explanation.

In accordance with certain arrangements, a real-time event stream or a replay of an event log generated by a process execution engine is combined with one or more predetermined event pattern specifications, and the combination is input to a complex event processing (CEP) engine. The input may also include one or more events that though not generated by the process execution engine—that is, external events—are nonetheless part of a pattern specified by the predetermined event pattern specification(s) and that may affect the outcome generated by the process execution engine. The events generated by the process execution engine, and possibly one or more external events, are input along with the predetermined event pattern specification(s) into the CEP engine. Based on the input, the CEP engine generates an enriched event log. The enriched event log includes the events as well as one or more situational contexts derived by the CEP engine, the derivation by the CEP based on the events and predetermined event pattern specification(s). The enriched event log is input to an AI explainability framework. The AI explainability framework, with input of the enriched event log, generates a hypothesis-oriented, situationally aware explanation.

In another aspect, the inventive arrangements disclosed herein provide independent, machine-generated hypothetical situations to be considered as potential input for the determination of the most likely situation(s) that are the reason(s) for the outcome generated by the process execution engine. The determination is not ad hoc, but rather, is generated by the machine independent of human effort. Being independently generated, the determination is likely devoid of human subjectivity and/or bias. The determination is characterized by enhanced accuracy and a richer domain for determining more precisely why a process execution engine (e.g., BPM engine) generates a particular outcome. Moreover, the determination can test whether and to what extent different hypothetical situations affect the outcomes generated by the process execution engine.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code in block 150 involved in performing the inventive methods, such as a situation-aware AI explainability (SALE) framework 200 implemented as executable program code or instructions. SAIF framework 200 is capable of generating a hypothesis-oriented situationally aware explanation that explains which variable or factor determines the outcome of a process executed by a process execution engine. Optionally, if more than one variable or factor affects the outcome, SAIF framework 200 can determine how strong an influence each of the variables or features had on the outcome.

Computing environment 100 additionally includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and SAIF framework 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (e.g., a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
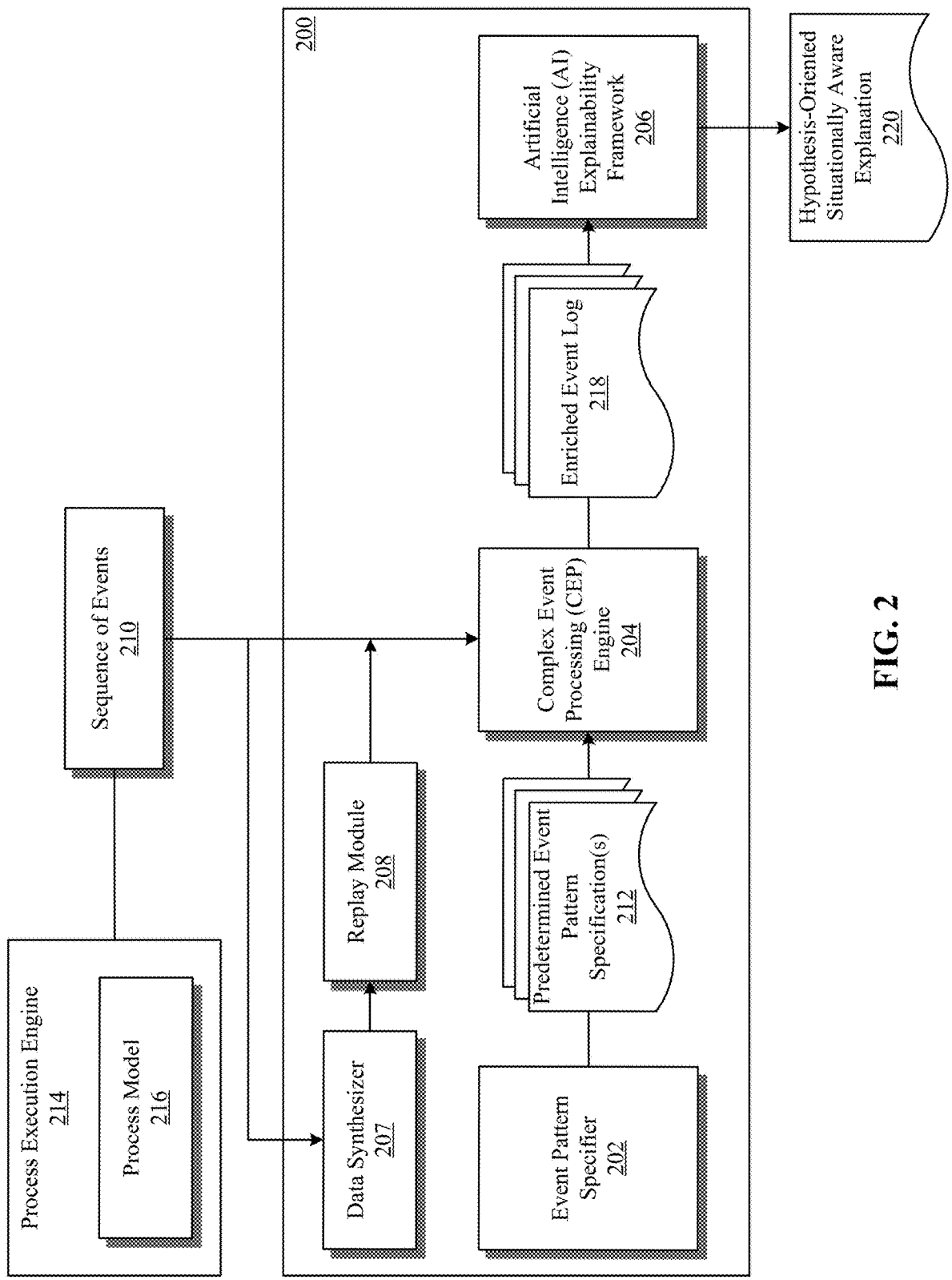
FIG. 2 illustrates an example architecture of the executable SALE framework illustrated in FIG. 1.

FIG. 2 illustrates an example architecture for the executable SAIF framework 200 of FIG. 1. Illustratively, in FIG. 2, the example architecture of SAIF framework 200 includes event pattern specifier 202, complex event processing (CEP) engine 204, and artificial intelligence (AI) explainability framework 206. The example architecture of SAIF framework 200 optionally also includes data synthesizer 207 and replay module 208.

Figure 3:
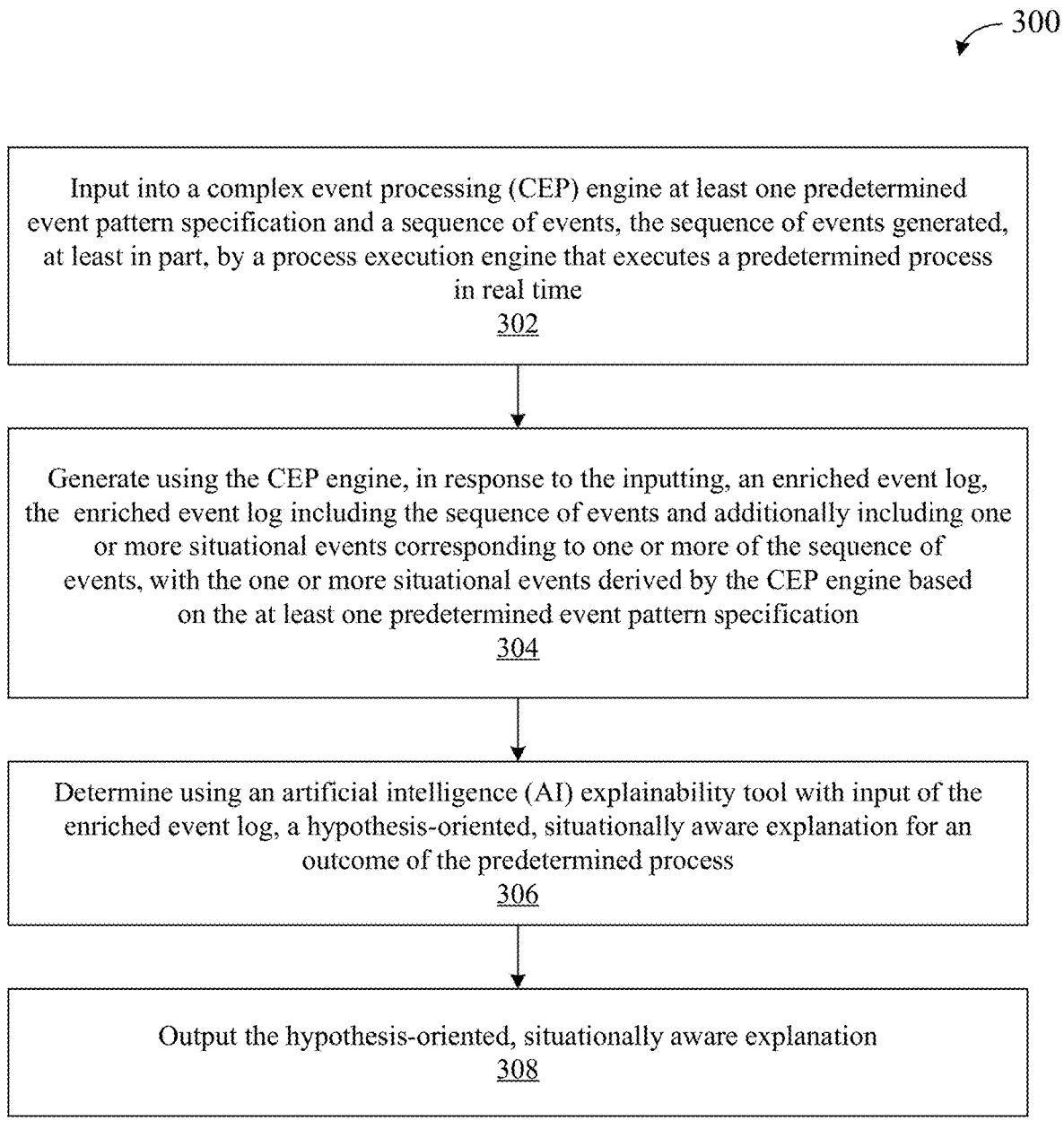
FIG. 3 illustrates an example method of operation of the SALE framework illustrated in FIGS. 1 and 2.

FIG. 3 illustrates an example method 300 of operation of SAIF framework 200 of FIGS. 1 and 2. Referring jointly to FIGS. 2 and 3, in block 302, sequence of events 210 are input to CEP engine 204.

Sequence of events 210 are generated by process execution (PE) engine 214. In certain embodiments, PE engine 214 can be implemented in one device (not shown) that is communicatively coupled via a wired or wireless connection with the device in which CEP engine 204 is implemented. PE engine 214, in some embodiments, is a BPM engine. In other embodiments, PE engine 214 is one of various other types of event processing engines configured to execute various types of processes in accordance with process model 216. Process model 216 specifies the logic underlying the execution flow of the process, including tasks and/or activities, conditional splits (gateways), conditional joins of events, transitions between different tasks, and/or other algorithmic operations.

A process executed by PM engine 214 in accordance with process model 216 comprises a specific series of process events (tasks or activities) instantiated during execution of the process. Each event of sequence of events 210 is a process event that corresponds to an instantiation of tasks and/or activities of the specific process executed by PM engine 214. A process event can be a task execution (e.g., decision to approve or reject a loan application) performed in response to user input and/or an automated activity execution (e.g., algorithmic screening an applicant's CV). Execution of the entire process yields a specific outcome.

The outcome is a function of the specific series of process events instantiated during execution of the process. For example, sequence of events 210 in the context of a loan approval process can include background screening, income assessment, and credit check, leading to the outcome of grant or rejection of the loan, as executed by PE engine 214.

In block 302, sequence of events 210 and one or more predetermined event pattern specifications 212 are input to CEP engine 204. Predetermined event pattern specification(s) 212 are generated by event pattern specifier 202 in response to user input. Execution of a process by PE engine 214 typically runs within a dynamic environment, in which many situational conditions, though not captured by process model 216, can nonetheless affect process execution outcomes. Thus, these situational conditions that are not captured by process model 216 but affect the outcome must be accounted for in order to provide a complete explanation for the outcome. Predetermined event pattern specification(s) 212 correspond to the situational conditions not captured by process model 216.

In certain instances, as described more fully below, one or more external events (not shown) may also be input to CEP engine 204. The one or more external events though generated by, or obtained from, a source other than process execution engine 214 may be part of an event pattern specified by predetermined event pattern specification(s) 212 and may influence or determine the outcome of a process instantiation by process execution engine 214 according to process model 216.

In block 304, CEP engine 204 is capable of generating enriched event log 218 based on, and in response to, the input of sequence of events 210 and predetermined event pattern specification(s) 212. Enriched event log 218 includes sequence of events 210. Additionally, enriched event log 218 includes one or more situational contexts generated by CEP engine 204 based on the input of predetermined event pattern specification(s) 212. The situational contexts correspond to one or more events (process events) of sequence of events 210. Each situational context identifies one or more situational conditions under which instantiation of a corresponding process event among sequence of events 210 occurred.

Predetermined event pattern specification(s) 212 implemented by CEP engine 204 for deriving situational conditions can be specified by a user during build-time. Specified event patterns can be composed primarily of patterns specified according to predetermined event pattern specification(s) 212, but in certain situations also can include specifications of various consumers and producers of the output (e.g., which systems originate input events and which systems utilize the detected situations). Predetermined event pattern specification(s) 212 can specify events (names and payloads) that are part of the inputs and output of CEP engine 204. During run-time, the input events enter CEP engine 204 and are matched against the specified event patterns in real-time. If a situation is detected—that is, a specified event pattern is satisfied—then, the relevant situation (also an event) is output by CEP engine 204. The input events can originate from heterogenous sources (event producers) The situations derived by CEP engine 204 are consumed by the consumers.

Predetermined event pattern specification(s) 212 can be stateless, acting simply as a filter, or more sophisticated stateful operators, such as aggregators (e.g., average, sum, trend) of an event. Stateful operators can operate within predetermined time windows. The events from which CEP engine 204 derives situations according to predetermined event pattern specification(s) 212 comprise sequence of events 210 generated by PE engine 214. The events also may include external events. Though generated by or obtained from a source external to PE engine 214, external events nonetheless may be part of an event pattern specified according to predetermined event pattern specification(s) 212 and thus also may affect or determine the outcome of a process instantiation by PE engine 214.

In certain arrangements, CEP engine 204 implements an event processing network (EPN) programming model. The EPN comprises a collection of event processing agents (EPAs), event producers, events, and event consumers. CEP engine 204 uses the EPN to describe the flow of sequence of events 210, and possibly one or more external events, originating at event producers and flowing through various event EPAs to eventually reach event consumers. With the EPA implemented by CEP engine 204, CEP engine 204 processes input events in search of matches between instantiated process events, using predetermined event pattern specification(s) 212 as a matching criterion. Each of predetermined event pattern specification(s) 212 specifies a specific event pattern that corresponds to and describes elements of a situational context (e.g., Covid-19 lockdown). The matching criterion is thus a function of the user input to event pattern specifier 202. An event pattern, per one or more predetermined event pattern specification(s) 212, is a template specifying one or more combinations of events. Given any specific sequence of events, CEP engine 204 is able to identify one or more subsets of events within the sequence that are potentially a manifestation of the situational context. The identification is made by CEP engine 204 matching a particular event pattern corresponding to the situational context with one or more of the events, that is, by matching one or more events generated by PE engine 214, and possible one or more external events, with an event pattern specified by predetermined event pattern specification(s) 212.

Through matching, CEP engine 204 can bind one or more predetermined event pattern specification(s) 212 to an event generated by PE engine 214 and/or an external event. Functionally, CEP engine 204 is thus capable of complimenting or enriching sequence of events 210 by injecting situation-derived events (new events) that are created to represent occurrences of situations derived by CEP engine 214, and that are not explicitly incorporated in process model 216, but that nonetheless potentially affect the outcome of a process instantiation or execution by PE engine 214. The matching performed by CEP engine 204 can be temporal, as for example when certain loan application rejections coincide with imposition of a Covid-19 lockdown. The matching performed by CEP engine 204, alternatively or additionally, can comprise semantical matching, in which certain verbal descriptions of a situation are linked linguistically with certain PE engine 214 events. CEP engine 204 thus injects situation-aware context into the stream of events generated by PE engine 214. Each situational context identified by CEP engine 204, accordingly, is a situational condition under which instantiation of the corresponding process event occurred and is output from CEP engine 204 as part of enriched event log 218.

In block 306, AI explainability framework 206, with input of the enriched event log 218, is capable of determining hypothesis-oriented, situationally aware explanation 220 of the outcome of the process executed by PE engine 214. Input of enriched event log 218, as generated by CPE engine 204, enables AI explainability framework 206 to process not merely the events executed by PE engine 214 but the situational context in which the events were executed. This allows for a richer, more nuanced and likely more accurate explanation of the outcome generated by PE engine 214 as rendered by hypothesis-oriented, situation aware explanation 220. AI explainability framework 206 is able to process enriched event log 218 to identify which factor or factors were significant in determining the outcome and the relative strength of the affect of each factor on the outcome generated by PE engine 214.

Functionally, AI explainability framework 206 uses a machine learning model M trained through supervised learning to act as a surrogate machine learning model for process model 216. Machine learning model M predicts outcomes of the process executed by PE engine 214. Predictions $M(\langle f_1, f_2, \ldots, f_n \rangle) = r$ are generated by machine learning model M based on feature vectors $\langle f_1, f_2, \ldots, f_n \rangle$, where the n features are factors that determine the outcome of the process executed within the specified situational contexts of enriched event log 218. AI explainability framework 206 determines, based on input $M(\langle f_1, f_2, \ldots, f_n \rangle) = r$, hypothesis-oriented, situationally aware explanation 220. In certain arrangements, hypothesis-oriented, situationally aware explanation 220, is itself an n-dimensional vector, $\langle w_1, w_2, \ldots, w_n \rangle$, where the weights indicate the relative impact of the factors represented by feature vector $\langle f_1, f_2, \ldots, f_n \rangle$ of the outcome of the process executed within the specified situational contexts of enriched event log 218. Thus, the weights can be used to rank order the relative importance of each of the events and their situational context that determine the specific outcome of the process executed by PE engine 214. As described, the n features are factors that determine the outcome of the process executed within specified situational contexts of enriched event log 218. Accordingly, the ranking can indicate the relative importance of one or more factors corresponding to the attributes of the events in enriched event log 218.

In block 308, AI explainability framework 206 outputs hypothesis-oriented, situationally aware explanation 220 of the outcome of the process executed by PE engine 214 that generated sequence of events 210.

CEP engine 204 is capable of event stream processing. With event stream processing, sequence of events 210 are processed in real time as streaming data, referred to as "data in motion." Event stream processing can provide near-real time responses to threats or opportunities as they emerge in real time. Accordingly, in certain arrangements, SAIF framework 200 determines hypothesis-oriented, situationally aware explanation 220 in real time. Hypothesis-oriented, situationally aware explanation 220 is generated by providing predetermined event pattern specification(s) 212 prior to, or nearly concurrently with, CEP engine 204's processing sequence of events 210 as each process event arrives.

In other arrangements, SAIF framework 200 determines hypothesis-oriented, situationally aware explanation 220 retrospectively based on a replay of an event log comprising sequence of events 210, and possibly one or more external events. As already described, sequence of events 210 corresponds to a collection of tasks that execute in a particular sequence to achieve a specific outcome. A sequence of events, in aggregate, provides a digital footprint, sometimes referred to as a "trace," which depicts a single execution of a process. Optionally, SAIF framework 200 includes data synthesizer 207, which generates a tabular dataset, T, comprising multiple traces, t. The data structure of each trace, $t \in T$, can be a row vector of T whose elements include an identifier corresponding an execution of the process, a timestamp, and event payload. Accordingly, t={(identifier, timestamps, payload)}. The payload can include data representations of the process events and situations under which the process events occur, including decision variables, activity status changes (e.g., start, pause, end), and outcome variables. Thus, the rows of tabular dataset, T, can indicate different states during each execution of the process. Task execution and completion times can be denoted, respectively, for each execution. Data synthesizer 207 transforms tabular dataset, T, into an event log that includes sequence of events 210.

In certain arrangements, SAIE framework 200 includes replay module 208 which generates an event log comprising multiple traces and inputs the event log into CEP engine 204.

Figure 4:
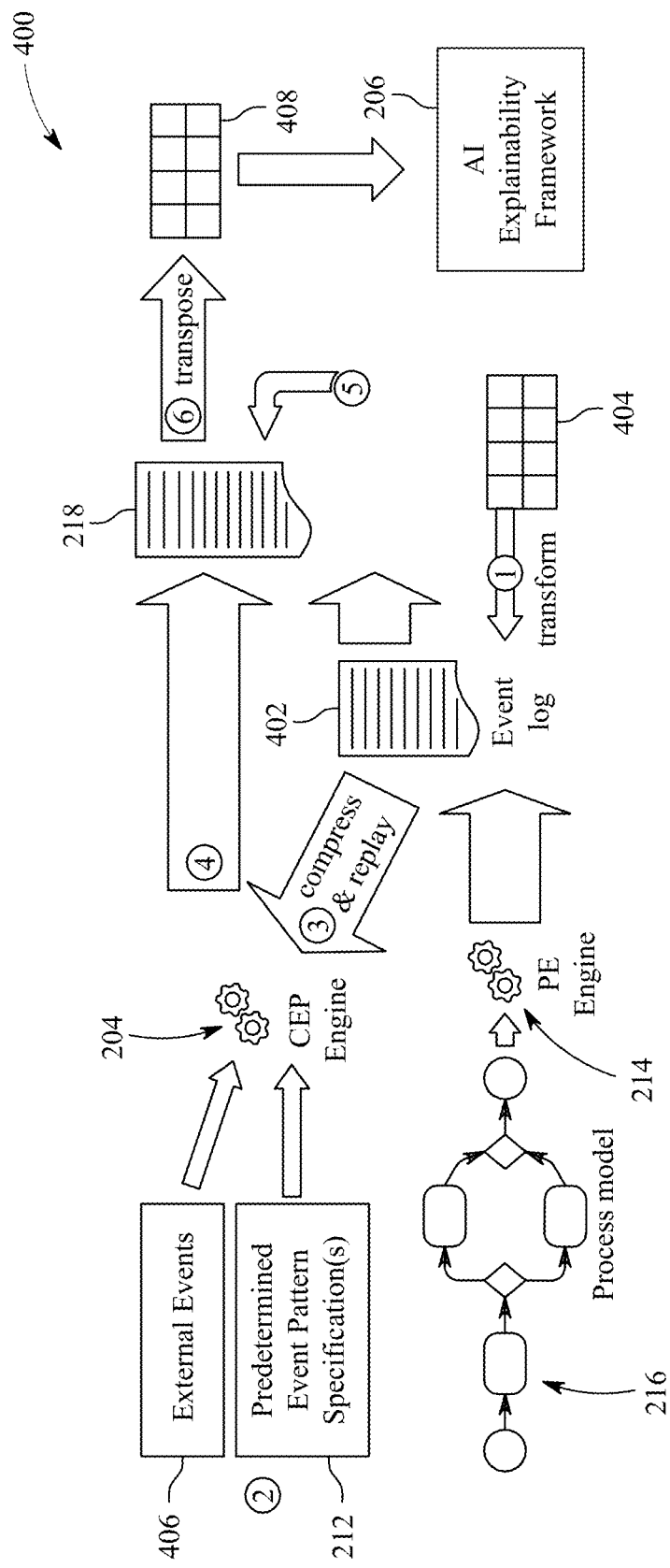
FIG. 4 illustrates an example sequence of procedures performed in retrospectively generating a hypothesis-oriented, situationally aware explanation of a process outcome using the SALE framework illustrated in FIGS. 1 and 2.

FIG. 4 schematically illustrates an example sequence of procedures 400 performed in generating a hypothesis-oriented, situationally aware explanation retrospectively based on a replay of an event log 402. Event log 402 is based on process events (sequence of events 210) generated by PE engine 214's executing a process in accordance with process model 216. Procedure 1, executed by data synthesizer 207, generates event log 402 by transforming tabular dataset 404. Procedure 2 feeds predetermined event pattern specification(s) 212 along with one or more external events 406 into CEP engine 204. Procedure 3, performed by replay module 208, optionally includes compressing event log 402 before replaying. The replaying entails replay module 208 simulating execution of the process, inputting the process events as though the process events were occurring in real time. Procedure 4, performed by CEP engine 204, generates enriched event log 218, which additionally includes one or more situational contexts in a form of new events derived by CEP engine 204 and corresponding to one or more of the process event patterns. Procedure 5 optionally adjusts one or more variables of enriched event log 218 in response to user input. Adjusting one or more decision variables enables the testing of different hypotheses regarding the effects of different situational contexts on the outcome of the process. In some arrangements, the output of CEP engine 204 is a JSON file. In this event, procedure 6 transforms enriched event log 218 into tabular format 408 prior to inputting it into AI explainability framework 206. After transposing, tabular format 408 of enriched event log 218 is input to AI explainability framework 206, which based on enriched event log 218, determines hypothesis-oriented, situationally aware explanation 220 as described above.

Figure 5B:
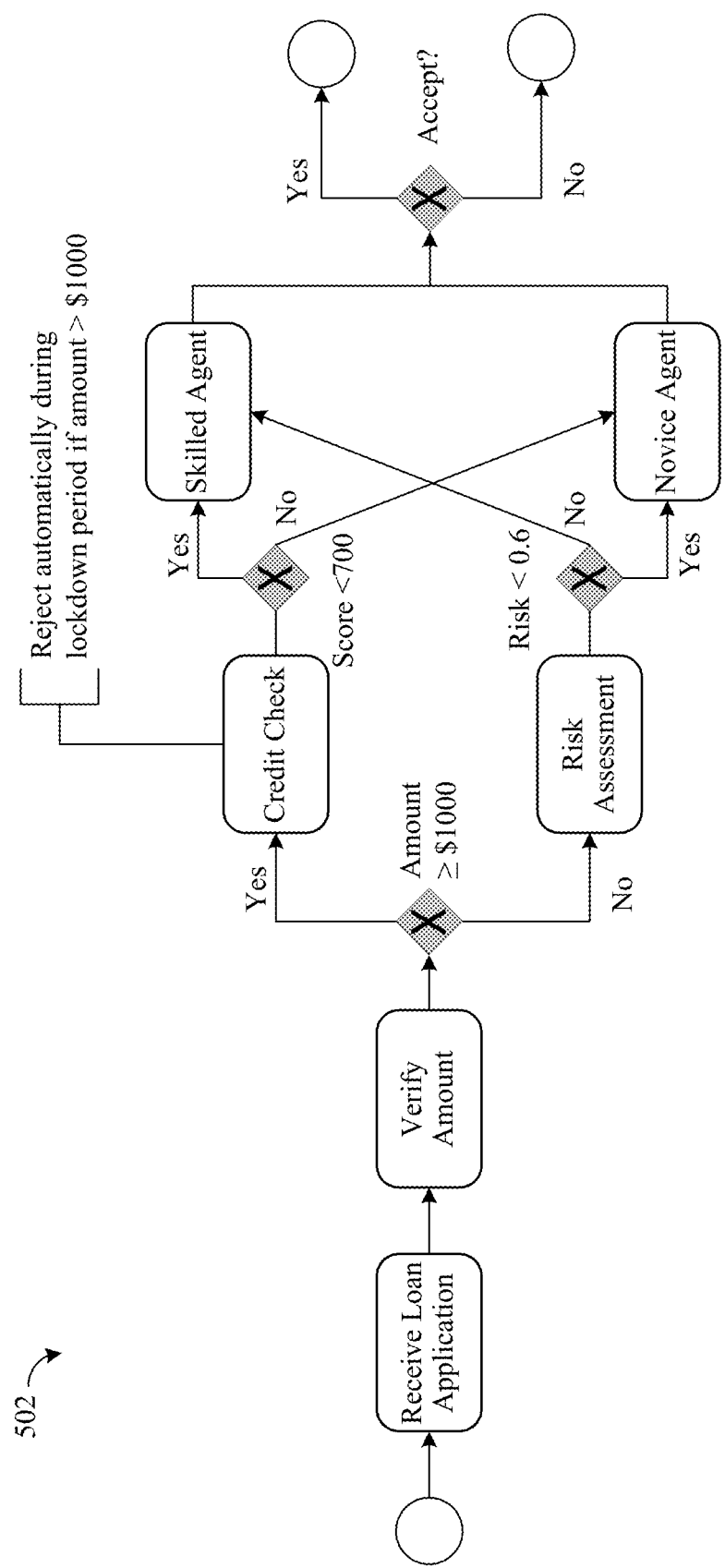

FIGS. 5A and 5B illustrate an example application of certain features of the SALE framework. Tabular dataset 500 of FIG. 5A represents an encoding of an instantiation of a process executed in accordance with process model 502 of FIG. 5B. Process model 502 may be implemented as described in connection with process model 216 of FIG. 2. Illustratively, process model 502 is a loan application process. According to process model 502 each application is processed as a sequence of events (predefined activities) that illustratively includes receiving a loan application, verifying the amount, and depending on the amount (decision junction), performing either a credit check or a risk assessment.

As illustrated by the instantiation encoding of tabular dataset 500, a tabular dataset includes a column for each decision variable. Each task is encoded in a Boolean column that indicates whether the task executed or not and the completion time (minutes). Events internal to the process are a combination of process events along with CEP-defined patterns representing situational contexts. These events are said to be tightly coupled with the process. In the present context, such an event is loan acceptance or rejection. External events are not coupled with execution of the process but can influence its execution and the outcome. External events are said not to be coupled with the process. In the present context, such an event is a Covid-19 lockdown, which though not coupled to the process, can affect the outcome. Combination events are ones that involve both internal and external events. Such an event, in the present context, is a loan risk-assessment coupled with a Covid-19 lockdown.

Three examples of situational contexts that, in the present context of loan processing, can be captured by SAIF framework 200 are agent overflow, delayed decision, and lockdown. The situation agent overflow is a situation that causes the process outcome, loan rejection, whenever more than a predetermined number (e.g., four) applications pile up in a system queue without further processing. The second situation, delayed decision, is a situation that causes the process outcome, loan rejection, whenever a predetermined number of days (e.g., two) have elapsed without processing an application. The other situation, lockdown, is a situation that causes the process outcome, loan rejection, if the loan application were submitted during the Covid-19 lockdown and is greater than a predetermined amount (e.g., $10,000).

In certain arrangements, predetermined event pattern specification(s) 212 implemented by CEP engine 204 in relation to the loan application process are contained in a file (e.g., JSON file). The situations derived by CEP engine 204 based on the specifications can include, for example:
- derive a situation AgentOverflow that causes the outcome loan application rejection if than n (e.g., 4) loan applications are currently pending in a system queue.
- derive a situation DecisionTimeMoreThanTwoDays that causes the outcome loan application rejection if the loan application remains in the system more than n (e.g., 2) days;
- derive a situation LockDownNewGuideline that causes the outcome loan application rejection if the loan application was submitted during the Covid-19 lockdown period requesting a loan amount greater than $10,000.

In the context of the loan application process, predetermined event pattern specification(s) 212 also can specify two external events, for example, that are part of the LockDownNewGuideline situation: LockDownInitiator and LockDownTerminator Operatively, data synthesizer 207 transforms tabular dataset 500 into an event log. The event log and one or more of the situations (agent overflow, delayed decision, and lockdown) are input to CEP engine 204. Optionally, replay module 208 can perform a time-based compression of the event log prior to input to CEP engine 204, such that if the process occurs over, say, several days, compression renders the event log re-playable in only minutes. CEP engine 204 generates enriched event log 218, which includes one or more situational contexts derived by the CEP engine 204 in response to inclusion of one or more of the predetermined event pattern specifications corresponding to the situations, agent overflow, delayed decision, and lockdown. Optionally, one or more decision variables of enriched event log 218 can be adjusted in response to user input. Based on the enriched event log 218, AI explainability framework 206 determines hypothesis-oriented, situationally aware explanation 220.

Without the enrichment of the different situations (AgentOverflow, DecisionTimeMoreThanTwoDays, and lockdown), AI explainability framework 206 would fail to capture the effect that such situations can have on the outcome of the loan application process. A rejection due to the Cov-19 lockdown, for example, might otherwise be attributed to some other factor. The enrichment gained by providing the different situations to CEP engine 204 enhances the input to AI explainability framework 206 and makes more likely a full and complete explanation of the outcome of the loan application process. Moreover, the ability to adjust decision variables enables a user to test different hypotheses pertaining to the different situations that might possibly affect the outcome.

The terminology used herein is for the purpose of describing embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   inputting into a complex event processing (CEP) engine at least one predetermined event pattern specification and a sequence of events, wherein the sequence of events is generated, at least in part, by a process execution engine executing a predetermined process in real time;
   generating, using the CEP engine in response to the inputting, an enriched event log, wherein the enriched event log includes the sequence of events and additionally includes one or more situational events derived by the CEP, and wherein the one or more situational events are derived by the CEP engine based on the at least one predetermined event pattern specification;
   determining, using an artificial intelligence (AI) explainability tool with input of the enriched event log, a hypothesis-oriented, situationally aware explanation for an outcome of the predetermined process; and,
   outputting, using computer hardware, the hypothesis-oriented, situationally aware explanation.

2. The method of claim 1, wherein the determining the hypothesis-oriented, situationally aware explanation comprises:
   determining a plurality of factors that determine the outcome of the predetermined process; and
   ranking the plurality of factors in response to determining a strength of association between the outcome and each of the plurality of factors.

3. The method of claim 1, wherein the sequence of events includes one or more external events generated by a source external to the process execution engine.

4. The method of claim 1, wherein the hypothesis-oriented situationally aware explanation is generated in real time.

5. The method of claim 1, wherein the hypothesis-oriented situationally aware explanation is generated retrospectively based on a replay of an event log comprising the sequence of events.

6. The method of claim 5, wherein the event log generated by transforming the sequence of events with a data synthesis prior to the inputting into the CEP engine, wherein the data synthesis generates a data structure for each execution of the process, the data structure including an identifier for each execution, a plurality of sequential events having a same identifier, a time stamp for each of the plurality of sequential events, and one or more decision variables corresponding to one or more of the plurality of sequential events.

7. The method of claim 6, further comprising adjusting at least one of the one or more decision variables based on a user input representing a hypothetical situation.

8. The method of claim 1, further comprising merging into a combined data structure events of the enriched event log that share a common identifier, wherein the merging is performed prior to inputting the enriched event log into the AI explainability framework.

9. A system, comprising:
A processor configured to initiate operations including:
  inputting into a complex event processing (CEP) engine at least one predetermined event pattern specification and a sequence of events, wherein the sequence of events is generated, at least in part, by a process execution engine executing a predetermined process in real time;
  generating, using the CEP engine in response to the inputting, an enriched event log, wherein the enriched event log includes the sequence of events and additionally includes one or more situational events derived by the CEP, and wherein the one or more situational events are derived by the CEP engine based on the at least one predetermined event pattern specification;
  determining, using an artificial intelligence (AI) explainability tool with input of the enriched event log, a hypothesis-oriented, situationally aware explanation for an outcome of the predetermined process; and,
  outputting, using computer hardware, the hypothesis-oriented, situationally aware explanation.

10. The system of claim 9, wherein the determining the hypothesis-oriented, situationally aware explanation comprises:
  determining a plurality of features that determine the outcome of the predetermined process; and
  ranking the plurality of features in response to determining a strength of association between the outcome and each of the plurality of features.

11. The system of claim 9, wherein the sequence of events includes one or more external events generated by a source external to the process execution engine.

12. The system of claim 9, wherein the hypothesis-oriented situationally aware explanation is generated in real time.

13. The system of claim 9, wherein the hypothesis-oriented situationally aware explanation is generated retrospectively based on a replay of an event log comprising the sequence of events.

14. The system of claim 13, wherein the event log generated by transforming the sequence of events with a data synthesis prior to the inputting into the CEP engine, wherein the data synthesis generates a data structure for each execution of the process, the data structure including an identifier for each execution, a plurality of sequential events having a same identifier, a time stamp for each of the plurality of sequential events, and one or more decision variables corresponding to one or more of the plurality of sequential events.

15. The system of claim 14, wherein the processor is configured to initiate operations further including adjusting at least one of the one or more decision variables based on a user input representing a hypothetical situation.

16. The system of claim 9, wherein the processor is configured to initiate operations further including merging into a combined data structure events of the enriched event log that share a common identifier, wherein the merging is performed prior to inputting the enriched event log into the AI explainability framework.

17. A computer program product, the computer program product comprising:
  one or more computer-readable storage media and program instructions collectively stored on the one or more computer-readable storage media, the program instructions executable by a processor to cause the processor to initiate operations including:
    inputting into a complex event processing (CEP) engine at least one predetermined event pattern specification and a sequence of events, wherein the sequence of events is generated, at least in part, by a process execution engine executing a predetermined process in real time;
    generating, using the CEP engine in response to the inputting, an enriched event log, wherein the enriched event log includes the sequence of events and additionally includes one or more situational events derived by the CEP, and wherein the one or more situational events are derived by the CEP engine based on the at least one predetermined event pattern specification;
    determining, using an artificial intelligence (AI) explainability tool with input of the enriched event log, a hypothesis-oriented, situationally aware explanation for an outcome of the predetermined process; and,
    outputting, using computer hardware, the hypothesis-oriented, situationally aware explanation.

18. The computer program product of claim 17, wherein the determining the hypothesis-oriented, situationally aware explanation comprises:
  determining a plurality of features that determine the outcome of the predetermined process; and
  ranking the plurality of features in response to determining a strength of association between the outcome and each of the plurality of features.

19. The computer program product of claim 17, wherein the hypothesis-oriented situationally aware explanation is generated in real time.

20. The computer program product of claim 17, wherein the hypothesis-oriented situationally aware explanation is generated retrospectively based on a replay of an event log comprising the sequence of events.

* * * * *